US009967771B2

United States Patent
Pazhyannur et al.

(10) Patent No.: US 9,967,771 B2
(45) Date of Patent: May 8, 2018

(54) TRANSMIT NODE DETECTION BY A RECEIVER IN A SHARED ACCESS LTE ENVIRONMENT

(71) Applicant: Cisco Technology, Inc., San Jose, CA (US)

(72) Inventors: Rajesh Pazhyannur, Fremont, CA (US); Brian Hart, Sunnyvale, CA (US); Andrew Myles, Turranurra (AU); Vikram Chandrasekhar, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 14/933,056

(22) Filed: Nov. 5, 2015

(65) Prior Publication Data

US 2016/0135080 A1 May 12, 2016

Related U.S. Application Data

(60) Provisional application No. 62/076,573, filed on Nov. 7, 2014.

(51) Int. Cl.
*H04W 28/04* (2009.01)
*H04B 17/318* (2015.01)
(Continued)

(52) U.S. Cl.
CPC ........ *H04W 28/048* (2013.01); *H04B 17/318* (2015.01); *H04L 43/16* (2013.01);
(Continued)

(58) Field of Classification Search
CPC . H04W 28/048; H04W 16/14; H04W 72/044; H04B 17/318; H04L 43/16
See application file for complete search history.

(56) References Cited

U.S. PATENT DOCUMENTS

2006/0223448 A1 10/2006 Kruys
2010/0081394 A1* 4/2010 Mashimo ............. H04W 16/14
455/70
(Continued)

FOREIGN PATENT DOCUMENTS

EP 2 757 850 A1 * 7/2014 ............ H04W 72/12
EP 2757850 A1 7/2014

OTHER PUBLICATIONS

A. Mukherjee et al., "System Architecture and Coexistence Evaluation of Licensed-Assisted Access LTE with IEEE 802.11", 6 pages.
(Continued)

*Primary Examiner* — Yemane Mesfin
*Assistant Examiner* — Henry Baron
(74) *Attorney, Agent, or Firm* — Edell, Shapiro & Finnan, LLC

(57) ABSTRACT

Presented herein are mechanisms to reduce collisions in deployments with Wi-Fi and Shared Access LTE (SAC-LTE) equipment as well SAC-LTE equipment from multiple operators. The mechanisms enhance the baseline energy detection mechanism by incorporating methods to decode cross-technology physical layer elements and media access control (MAC) layer elements in the Wi-Fi system to elements in the SAC-LTE system. The methods described improve the detection potential for transmitters, thereby reducing chances of cross-technology collisions.

20 Claims, 8 Drawing Sheets

(51) Int. Cl.
- *H04L 12/26* (2006.01)
- *H04W 72/04* (2009.01)
- *H04W 16/14* (2009.01)
- *H04W 74/08* (2009.01)
- *H04W 84/12* (2009.01)

(52) U.S. Cl.
CPC ......... *H04W 16/14* (2013.01); *H04W 72/044* (2013.01); *H04W 74/0808* (2013.01); *H04W 84/12* (2013.01)

(56) References Cited

U.S. PATENT DOCUMENTS

| | | |
|---|---|---|
| 2011/0205986 A1 | 8/2011 | Medapalli |
| 2011/0222409 A1 | 9/2011 | Sun et al. |
| 2013/0315152 A1 | 11/2013 | Ratasuk et al. |
| 2013/0343288 A1 | 12/2013 | Ratasuk et al. |
| 2014/0036818 A1 | 2/2014 | Koskela et al. |
| 2014/0341207 A1 | 11/2014 | Bhushan et al. |
| 2015/0043523 A1 | 2/2015 | Luo et al. |
| 2015/0063148 A1 | 3/2015 | Sadek |
| 2015/0223243 A1* | 8/2015 | Tabet .................. H04W 28/085 370/330 |

OTHER PUBLICATIONS

"LTE for unlicensed spectrum", Nokia Networks, White Paper, networks.nokia.com, 12 pages.

International Search Report and Written Opinion in corresponding International Application No. PCT/US2015/059131, dated Apr. 8, 2016, 16 pages.

Partial International Search Report and Written Opinion in counterpart International Application No. PCTUS2015/059131, dated Jan. 29, 2016, 7 pages.

\* cited by examiner

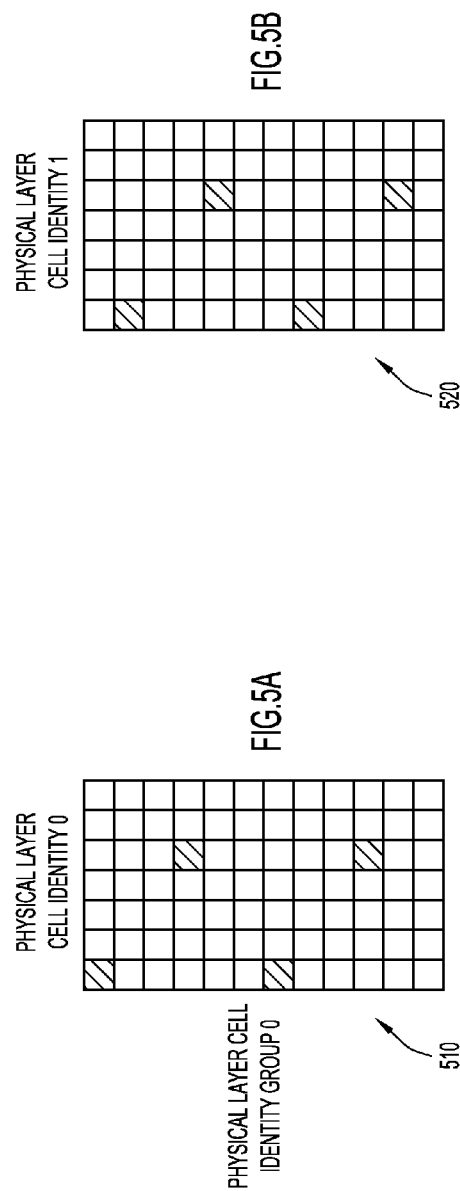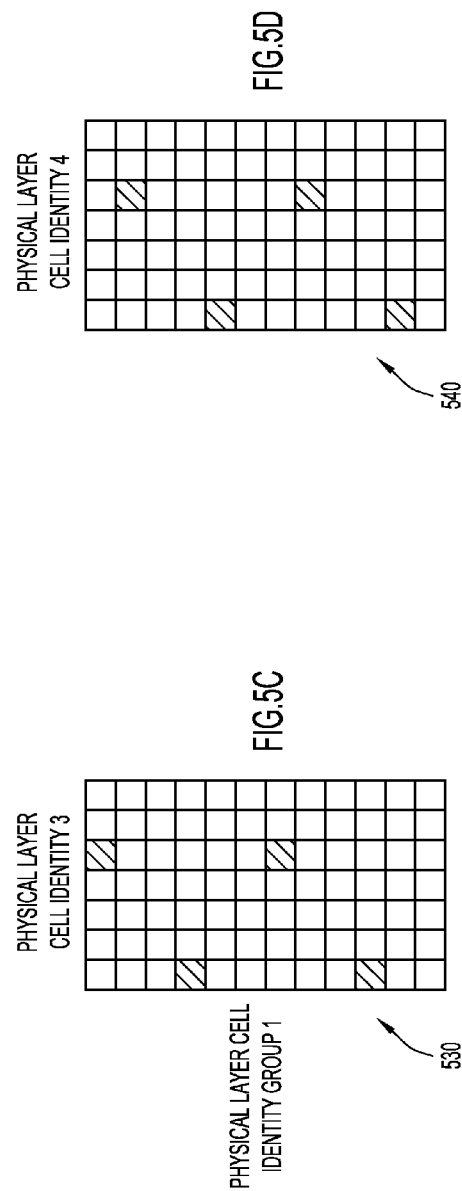

TRANSMIT NODE DETECTION BY A RECEIVER IN A SHARED ACCESS LTE ENVIRONMENT

CROSS-REFERENCE TO RELATED APPLICATION

This application claims priority to U.S. Provisional Application No. 62/076,573, filed Nov. 7, 2014, the entirety of which is incorporated herein by reference.

TECHNICAL FIELD

The present disclosure relates to wireless networks.

BACKGROUND

Wi-Fi® equipment and Licensed-Assisted Access (LAA) of the Long Term Evolution (LTE) wireless standard are expected to share the same spectrum (5 GHz for example). To ensure co-existence in the same channel, LAA-LTE is expected to deploy some form of Listen-before-Talk (LBT) mechanism. Such LBT mechanisms are even required in certain regulatory domains (like the European Telecommunications Standards Institute (ETSI), for instance). The sensing mechanism required is "energy-detect" in the operating channel. For example, Wi-Fi implements Clear Channel Assessment Energy Detect (CCA-ED) to detect non Wi-Fi sources in the operating channel. This threshold typically set to −62 dBm/20 MHz.

It is generally anticipated that LAA-LTE will implement something similar to CCA-ED. However, in many deployment scenarios this will not be enough to avoid collisions between Wi-Fi and LAA-LTE. A Wi-Fi device and LTE device implementing LAA may not be able to detect each other based on energy detect thresholds, but a Wi-Fi receiver may indeed be interfered with by a LAA-LTE transmitter and vice versa. Specifically, if a Wi-Fi device and an LAA-LTE device were to transmit at the same time, there will be incidents of packet collisions.

BRIEF DESCRIPTION OF THE DRAWINGS

FIGS. 5A, 5B, 5C, and 5D illustrates examples of Physical Layer Cell Identity sequences that may be detected by an LTE (LAA) device to infer whether or not another LAA transmitter is in the middle of an ongoing transmission burst, according to an example embodiment.

DESCRIPTION OF EXAMPLE EMBODIMENTS

Overview

Figure 1:
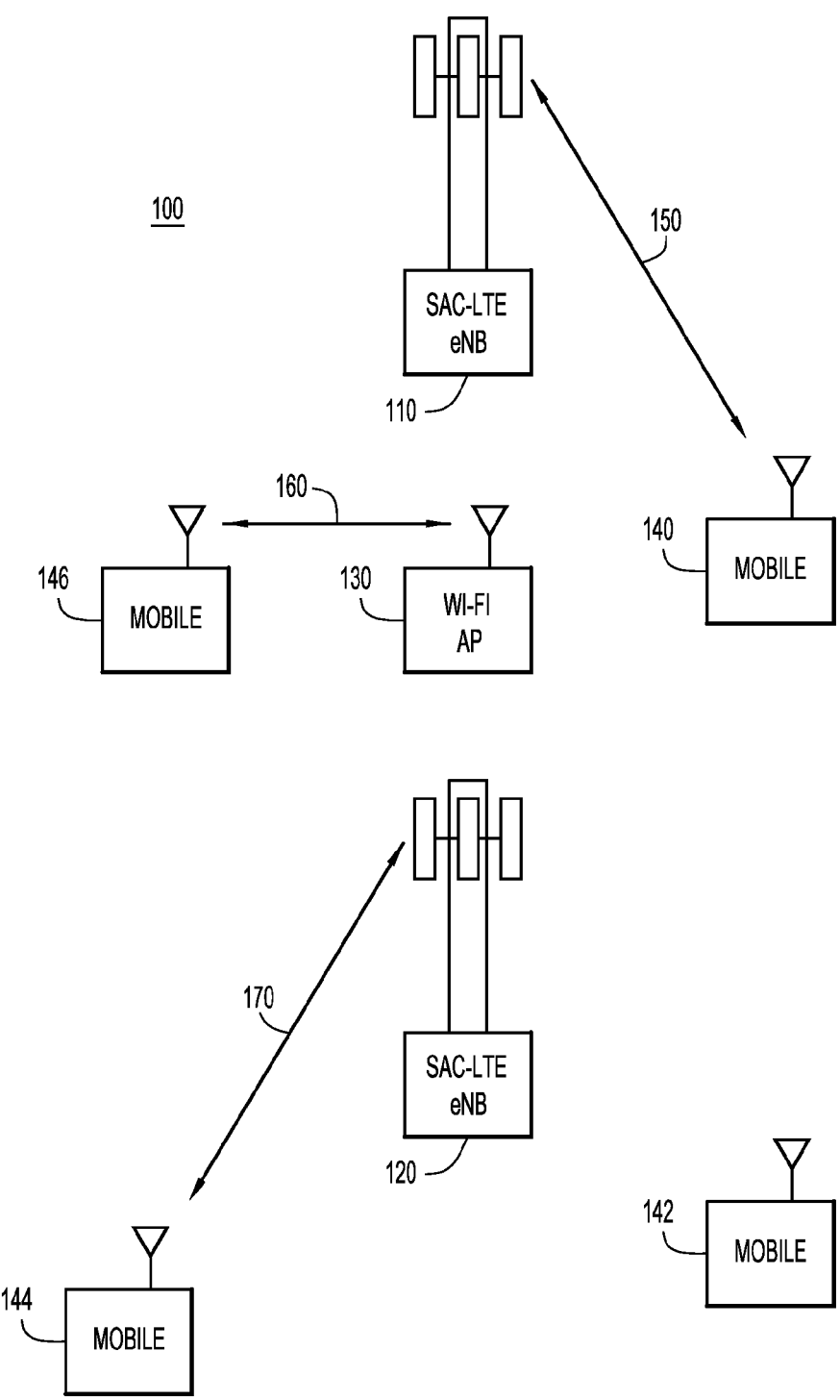
FIG. 1 is a system block diagram illustrating examples of scenarios in which the interference avoidance methods presented herein may be employed, according to an example embodiment.

Methods are presented herein to improve cross-technology (e.g., Wi-Fi, LAA) node detection to reduce collisions. The following mechanisms extend beyond simple energy detection and can reduce LAA collisions with Wi-Fi transmissions. Additionally, methods are presented to reduce collisions between two LAA-LTE transmitters operating in a shared spectrum. Further, the techniques presented herein may be applied to any wireless device using LTE-like transmissions in a shared/unlicensed spectrum (e.g., LTE-U, LAA, etc.), which may be referred to hereinafter as Shared Access LTE (SAC-LTE) transmissions.

In one example, a method is provided for minimizing interference between cross-technology wireless transmissions in a shared spectrum. The method comprises, at a first wireless device, obtaining data to be wirelessly transmitted in a frame according to a first format over a shared spectrum. The wireless device detects a wireless preamble to a wireless transmission in a second format on the shared/unlicensed spectrum. The wireless transmission is transmitted from a second wireless device using the second format. The wireless device decodes the wireless preamble, which was transmitted using the second format, and determines a minimum amount of time the wireless device should defer its access, to the unlicensed spectrum based on the decoded wireless preamble. The wireless device may also determine how much to lower its energy detection threshold based on the decoded wireless preamble. The wireless device transmits the data in the frame over the unlicensed spectrum, after the minimum amount of time, such that interference between the frame in the first format and the wireless transmission in the second format is minimized.

In another example, a method is provided for minimizing interference between two SAC-LTE transmissions occurring over a shared, unlicensed spectrum. The method comprises, at a first wireless device, obtaining data to be wirelessly transmitted in a first SAC-LTE transmission burst opportunity (TXOP) over the unlicensed spectrum. The first wireless device detects a second SAC-LTE transmission burst, comprising a set of reference signals, which may include a preamble, and data, transmitted from a second wireless device on the unlicensed spectrum. The first wireless device decodes the set of reference signals (e.g., the preamble, system information, etc.) transmitted from the second wireless device in the second SAC-LTE transmission burst. From the set of reference signals, the first wireless device may determine the identity of the second wireless device and the operator to which the second wireless device is registered. From the decoded preamble, the first wireless device determines a duration of the second SAC-LTE transmission burst. Determination of the burst duration enables the first wireless device to determine the minimum amount of time, excluding randomized backoffs, for the first wireless device has to defer its access to the unlicensed spectrum. The first wireless device may also lower its energy detection threshold, based on a received signal strength measurement of the decoded reference signal from the second wireless device. Subsequently, the first wireless device transmits the first SAC-LTE transmission burst over the unlicensed spectrum, after an elapsed time greater than or equal to the defer time, such that interference between the first LTE transmission burst and transmissions from the second wireless device are minimized.

DETAILED DESCRIPTION

Referring now to FIG. 1, a system block diagram illustrates examples of scenarios in which the methods presented herein are useful. SAC-LTE devices 110 and 120, such as evolved nodes B (eNBs), and a Wi-Fi access point 130 communicate with mobile devices 140, 142, 144, and 146. In one example, one or more of the mobile devices 140, 142, 144, and 146 may be capable of communicating across multiple technologies. SAC-LTE eNB 110 sends and receives communications 150 with mobile device 140. Wi-Fi access point 130 sends and receives Wi-Fi communications 160 with mobile device 146. SAC-LTE eNB 120 sends and receives communications 170 with mobile device 170. Communications 150 and 170 may occur over frequencies exclusive to the operator of the LTE network (e.g., licensed frequencies) and/or shared (e.g., unlicensed) frequencies. Wi-Fi communications 160 occur over shared frequencies. The SAC-LTE devices 110 and 120, as well as the Wi-Fi access point 130, are in sufficient proximity that there can be interference between Wi-Fi signals 160 and SAC-LTE signals 150/170.

Figure 2:
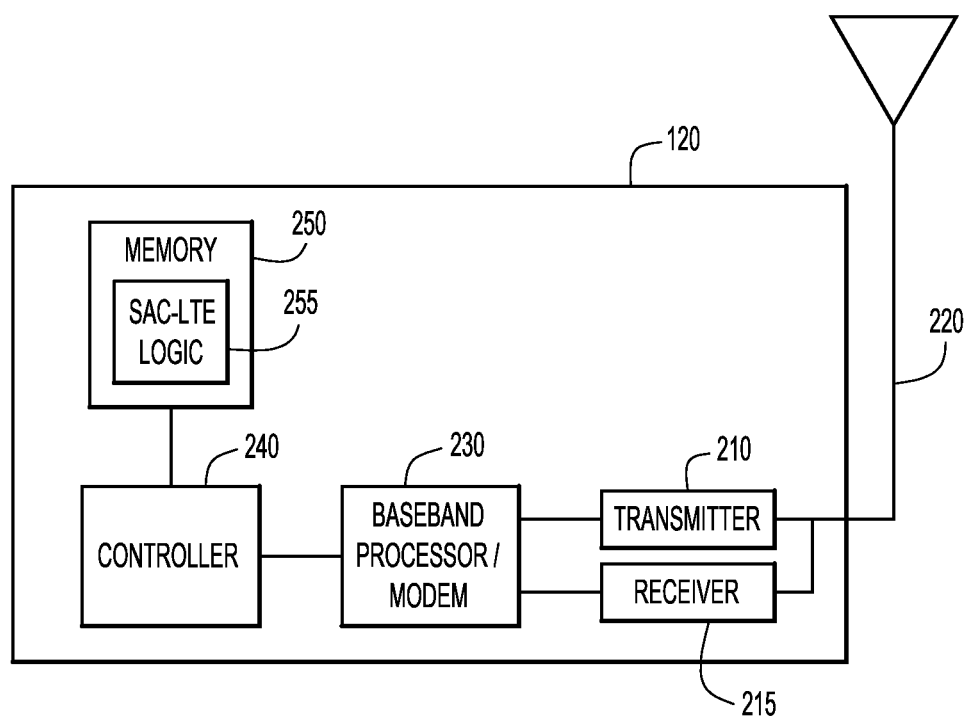
FIG. 2 is a simplified block diagram of a LTE device that may be configured to perform the methods presented herein, according to an example embodiment.

Referring now to FIG. 2, a simplified block diagram illustrates a wireless device, e.g., SAC-LTE eNB 120, configured to perform the methods presented herein. The SAC-LTE eNB 120 is shown as an example of a wireless device, but other wireless devices (e.g., mobile device 140) may include similar components that perform similar methods. The wireless device 120 includes a transmitter 210 (or multiple transmitters), a receiver 215 (or multiple receivers), an antenna 220, a baseband processor 230 (e.g., a modem), and a controller 240 (e.g., a processor such as a microprocessor or microcontroller). The receiver 215 may comprise one or more receivers with the capability to detect signals according to a plurality of formats, e.g., Wi-Fi, LTE, and SAC-LTE signals. The baseband processor 230 may perform media access control (MAC) functions as well as physical layer (PHY) functions. The methods presented herein may be implemented by control logic in the baseband processor 230. The control logic may take the form of fixed or programmable digital logic gates. In another form, the control logic may be implemented by instructions stored/encoded in memory 250 (e.g., SAC-LTE logic 255) and executed by the controller 240. Additionally, the wireless device 115 may include a wired network interface unit (not shown) to communicate with other computing devices over a wired network.

The memory 250 may include read only memory (ROM), random access memory (RAM), magnetic disk storage media devices, optical storage media devices, flash memory devices, electrical, optical, or other physical/tangible memory storage devices. Thus, in general, the memory 250 may comprise one or more tangible (non-transitory) computer readable storage media (e.g., a memory device) encoded with software comprising computer executable instructions and when the software is executed (by the controller 240) it is operable to perform the operations described herein.

Figure 3A:
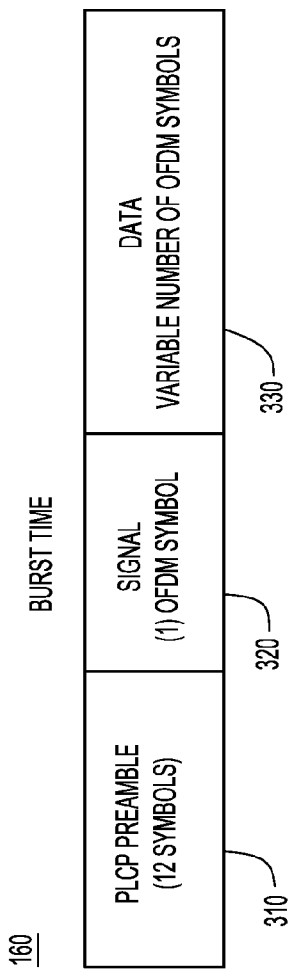
FIG. 3A illustrates an example of a Wi-Fi frame that includes a Physical Layer Convergence Procedure (PLCP) preamble that may be detected by an LTE (LAA) device in accordance with a method presented herein.

Referring now to FIG. 3A, one example of a Wi-Fi transmission 160 is shown. The Wi-Fi transmission 160 includes a PLCP preamble 310, a burst time field 320, and a data field 330. In a first method, the SAC-LTE device 120 can decode the Wi-Fi preamble 310 and additionally use a lower energy threshold based on detected preamble to determine the end of Wi-Fi burst 160 (e.g., physical layer protocol data unit (PDU)), before the SAC-LTE device 120 initiates a transmission 150. In one variation, the SAC-LTE device can use an auto-correlation or cross-correlation detector to determine the end of Wi-Fi burst.

Figure 3B:
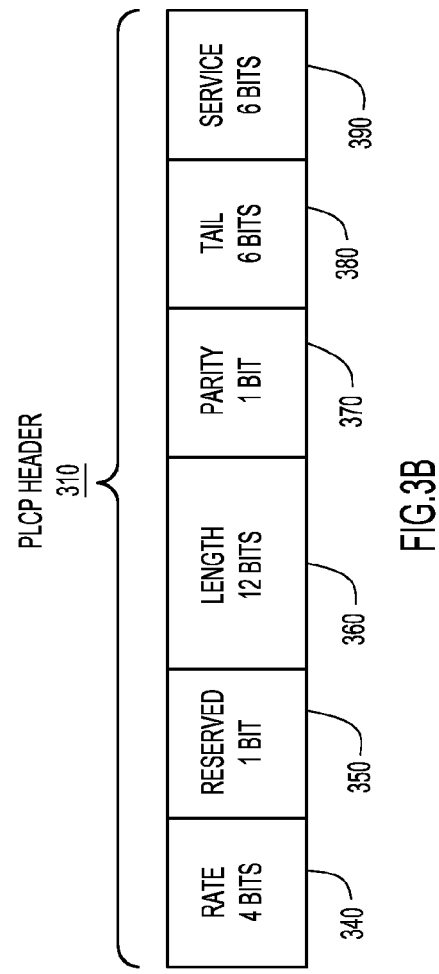
FIG. 3B illustrates a PLCP header having a length field that may be detected by an LTE (LAA) device in accordance with an example embodiment.

Referring now to FIG. 3B, a PLCP header 310 of a Wi-Fi frame is shown. The PLCP header 310 includes a rate field 340, a reserved bit 350, a length field 360, a parity bit 370, a tail field 380, and a service field 390. The SAC-LTE device 120 may decode the PLCP header 310 to determine the transmission time of the Wi-Fi frame. The transmission time is provided in the length field 360 of the PLCP header 310.

Figure 4A:
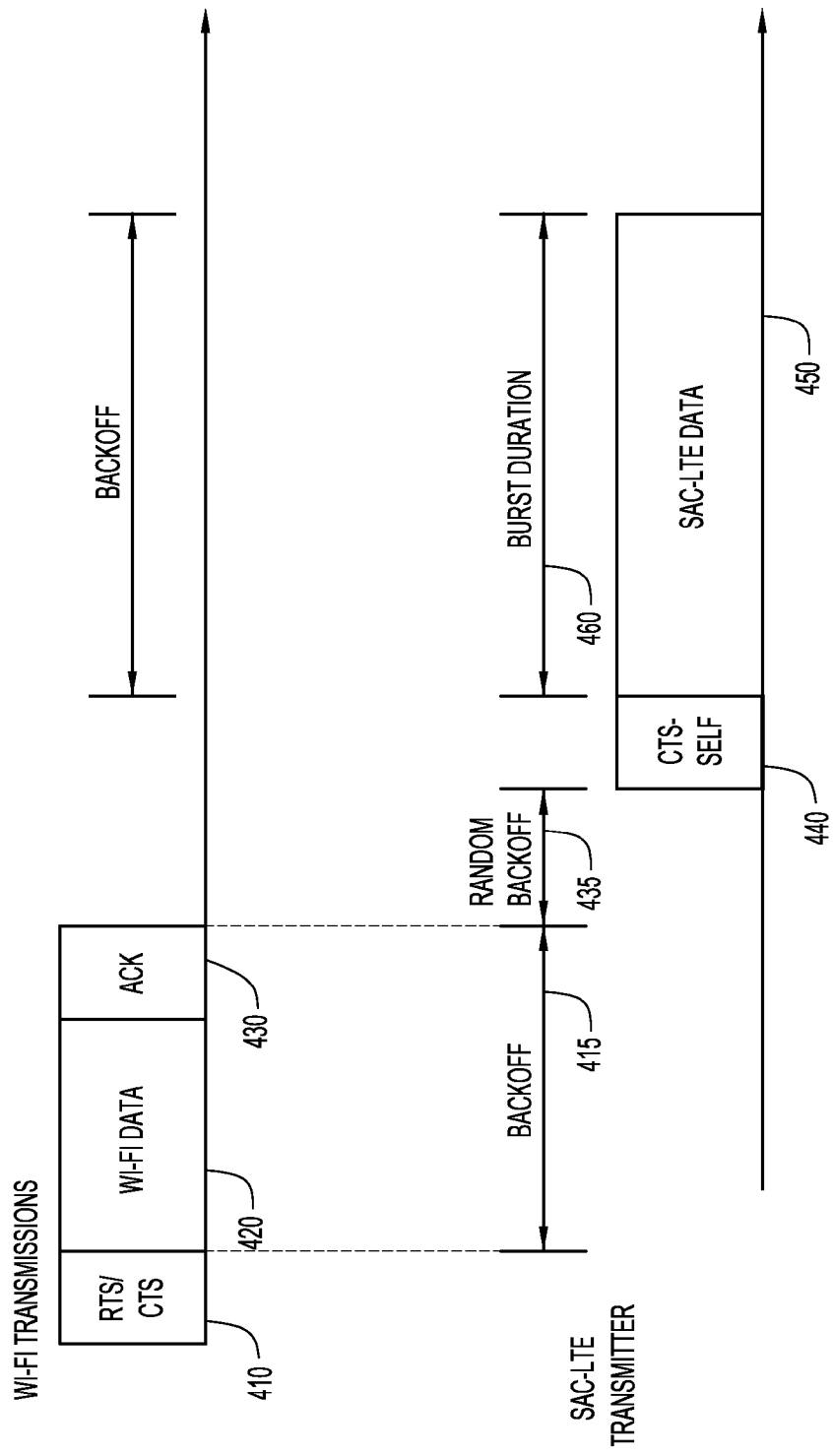
FIG. 4A illustrates a Ready-To-Send/Clear-To-Send technique that may be used by an LTE-LAA device before sending a transmission in order to avoid collision with Wi-Fi equipment, according to an example embodiment.

Referring now to FIG. 4A, a diagram illustrates an example of how the SAC-LTE device 120 may implement a reduced functionality Wi-Fi Physical Layer/Media Access Control (PHY/MAC) process to minimize interference with a Wi-Fi transmitter. The SAC-LTE device 120 monitors a Request-To-Send/Clear-To-Send (RTS/CTS) exchange 410. By decoding the RTS/CTS exchange 410, the SAC-LTE device 120 may determine the network allocation vector (NAV) of the Wi-Fi transmission, including an expected length of time that the medium will be occupied.

The SAC-LTE device 120 enters a backoff period 415 at least as long as the length of time indicated by the decoded NAV. After monitoring the data phase 420 and the acknowledgement 430, the SAC-LTE 120 determines that the medium is free. This ensures that the SAC-LTE device 120 waits until the entire transfer sequence (RTS, CTS, Data, Ack) is complete before accessing the medium. The SAC-LTE device may perform a randomly determined backoff process 435 after determining that the medium is free, to contend fairly for the medium with other potential transmitters. After determining that the medium remains free after the random backoff period 435, the SAC-LTE device 120 sends a CTS-Self frame 440 to reserve the medium for SAC-LTE data 450, and indicate to any Wi-Fi nodes to avoid access during the transmission opportunity (TXOP).

Figure 4B:
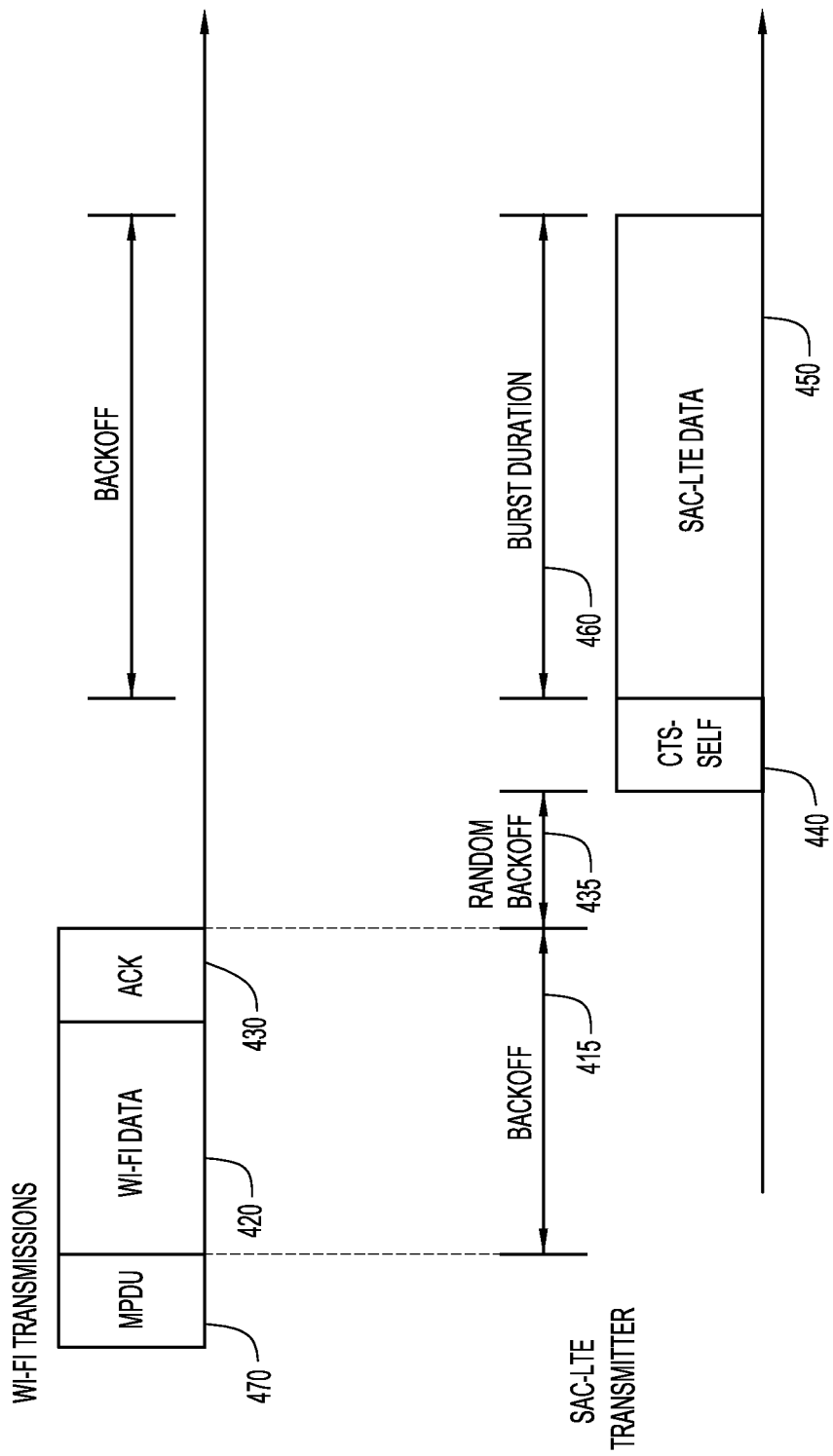
FIG. 4B illustrates a technique that may be used by an LTE-LAA device to decode a Media Access Control Protocol Data Unit before sending a transmission in order to avoid collision with Wi-Fi equipment, according to an example embodiment.

In one example, the SAC-LTE device 120 sends the CTS-Self frame 440 with the burst duration 460 of the SAC-LTE data 450 contained therein. The Wi-Fi transmitters detect the CTS-Self frame 440, determine the NAV and defer their transmissions until an elapsed time which is at least as large as the duration 460 of the SAC-LTE transmission 450 indicated via the NAV in the CTS-Self frame 440, so as not to interfere with the SAC-LTE transmission 450. The SAC-LTE device 120 sends the SAC-LTE data 450 during the time period that the Wi-Fi transmitters are backed off. In another example, rather than determine the NAV from the RTS/CTS exchange 410, the SAC-LTE device 120 may decode the MAC protocol Data Unit (MPDU) 470 of a Wi-Fi frame to determine the NAV, as shown in FIG. 4B.

Referring back to FIG. 1, the following steps beyond simple energy detection may inhibit Wi-Fi access point 130 or SAC-LTE device 110 from using the medium (i.e., the shared spectrum) and transmitting messages that collide with SAC-LTE transmissions from another SAC-LTE device 120 in the shared/unlicensed spectrum. There are two types of transmitters that send transmissions over the shared spectrum where they can potentially collide with the SAC-LTE transmissions from SAC-LTE device 120: Wi-Fi transmitters (e.g., access point 120) and SAC-LTE transmitters (e.g., eNB 110) from another operator. These interferers/colliders (e.g., access point 130 and eNB 110) may be referred to as potential SAC-LTE colliders. Additionally, SAC-LTE device 120 may be considered a potential SAC-LTE collider with SAC-LTE device 110.

The size of the SAC-LTE transmission burst opportunity (where a transmission burst opportunity (TXOP) is defined as a sequence of time-contiguous SAC-LTE transmissions consisting of a set of 1 ms LTE subframes, beginning and ending with possibly fractional (<1 ms) subframes) can vary in terms of an integer number of orthogonal frequency division multiplexed (OFDM) symbols (each symbol occupies 71 µs). The range of the burst size can vary between 1 symbol to up to K*14 symbols (K=1 corresponds to 1 ms subframe and K>1 corresponds to a maximum number of sub-frames dependent on configuration, cell-load, subject to regulatory constraints). Two methods are provided as examples through which a potential SAC-LTE collider 120 infers the presence of an ongoing SAC-LTE transmission.

In one example, the potential SAC-LTE collider 120 decodes a preamble comprising at least the Primary Synchronization Signal (PSS) or Secondary Synchronization Signal (SSS), a set of reference signal pilots and system information of a SAC-LTE transmission 150 from another SAC-LTE device 110. The preamble is used to signal the duration of the SAC-LTE transmission 150 as well as the Physical Cell Identity (PCI) of the SAC-LTE device 110. The PCI is carried within the preamble via the Primary Synchronization Signal. The PCI determines the sequence used to encode the Cell Specific Reference Signal (CRS) pilots as well as the location of the CRS pilots in frequency domain. FIGS. 5A, 5B, 5C, and 5D show examples of PCI sequences 510, 520, 530, and 540, respectively.

The SAC-LTE collider 120 determines the transmission duration by decoding the preamble contained within the SAC-LTE transmission 150. The SAC-LTE collider 120 may determine the identity of the operator to which the SAC-LTE device 110 belongs by decoding the system information sent as part of SAC-LTE transmission 150. Additionally, the potential SAC-LTE collider 120 may, after decoding the PSS/SSS contained within the preamble, infer/determine the identity of SAC-LTE device 110 via its PCI. The SAC-LTE collider 120 uses the PCI information as a reference to decode the Cell-Specific Reference Signal (CRS) pilot from the SAC-LTE transmitter 110. The decoding of the CRS pilot from the SAC-LTE transmitter 110 provides SAC-LTE collider 120 with a received signal strength measurement such as the Reference Signal Received Power (RSRP) while the transmission duration information helps SAC-LTE collider 120 infer/determine whether or not the SAC-LTE transmitter 110 is in the middle of an ongoing transmission burst and determine the TXOP duration. Based on the measured signal strength of SAC-LTE transmission 150, the SAC-LTE collider 120 potentially modifies its energy detect threshold. Based on the transmission duration contained within the decoded preamble, the SAC-LTE collider 120 determines how long it has to defer its access to the shared spectrum. The defer time will be at least as large as the time remaining until the end of the SAC-LTE transmission 150.

In another example, when the Potential SAC-LTE collider 120 decodes the Cell-Specific Reference Signal (CRS), the Potential SAC-LTE collider 120 uses a different set of pilot reference signals for measuring the received signal strength from the SAC-LTE transmitter. As an example, the Potential SAC-LTE collider 120 may decode the Channel State Information Reference Signal (CSI-RS) and/or the Discovery Reference Signal (DRS).

Figure 6:
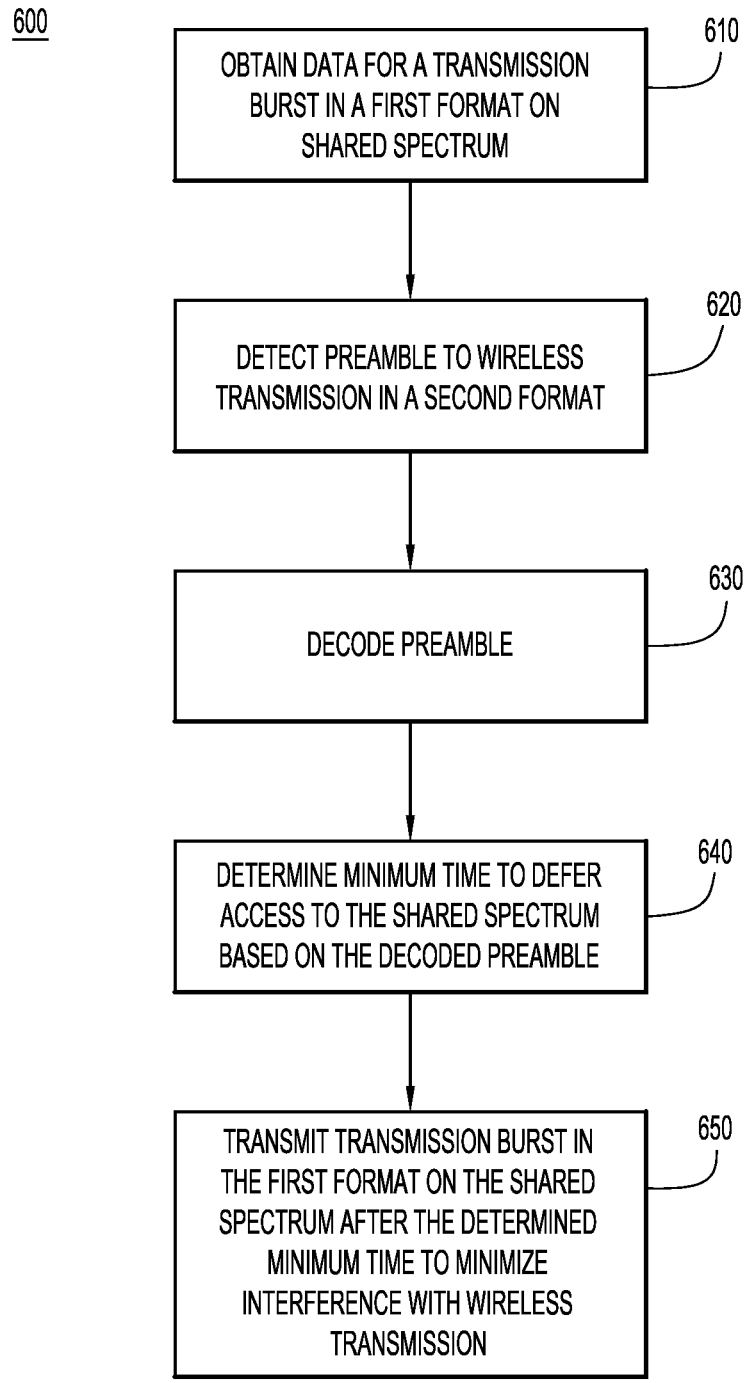
FIG. 6 is flowchart illustrating operations of an LTE device in minimizing interference on an unlicensed spectrum with a Wi-Fi device, according to an example embodiment.

Referring now to FIG. 6, a flowchart illustrates operations performed by a wireless device in minimizing interference with a cross-technology wireless device over a medium of shared spectrum, e.g., an unlicensed spectrum. In step 610, the wireless device (e.g., SAC-LTE device 120) obtains data to be transmitted within a TXOP using a first format (e.g., a SAC-LTE transmission burst). The TXOP is designated to be wirelessly transmitted over a shared spectrum. In step 620, the wireless device detects a wireless preamble being transmitted in the shared spectrum. The wireless preamble is in a second format (e.g., a Wi-Fi preamble, Wi-Fi RTS, Wi-Fi CTS) that is different than the first format. In one example, the wireless preamble comprises a PLCP header of a Wi-Fi transmission.

In step 630, the wireless device decodes the wireless preamble and determines a minimum time to defer access to the shared spectrum based on the decoded preamble in step 640. In one example, the wireless device adjusts an energy detection threshold, e.g., the wireless devices lowers its energy detection threshold so that it accesses the spectrum more conservatively by deferring to transmissions which are of lower received signal strength. In another example, determining the minimum time to defer access to the shared spectrum may involve monitoring and/or sending reservation exchange messages (e.g., RTS/CTS) that reserve specific times, via the Network Allocation Vector (NAV) for transmission in the shared spectrum. In step 650, the wireless device transmits the transmission burst in the first format on the shared spectrum after the determined minimum time such that it minimizes interference with the wireless transmission associated with the wireless preamble. In one example, the wireless device determines when the wireless transmission will end from the decoded wireless preamble (e.g., from the NAV), and defers its transmission until at least the duration contained within the NAV. This ensures that the wireless device does not commence its transmissions in the first format until an elapsed time greater than the duration indicated in the NAV, thereby guaranteeing that the existing wireless transmission has ended.

Figure 7:
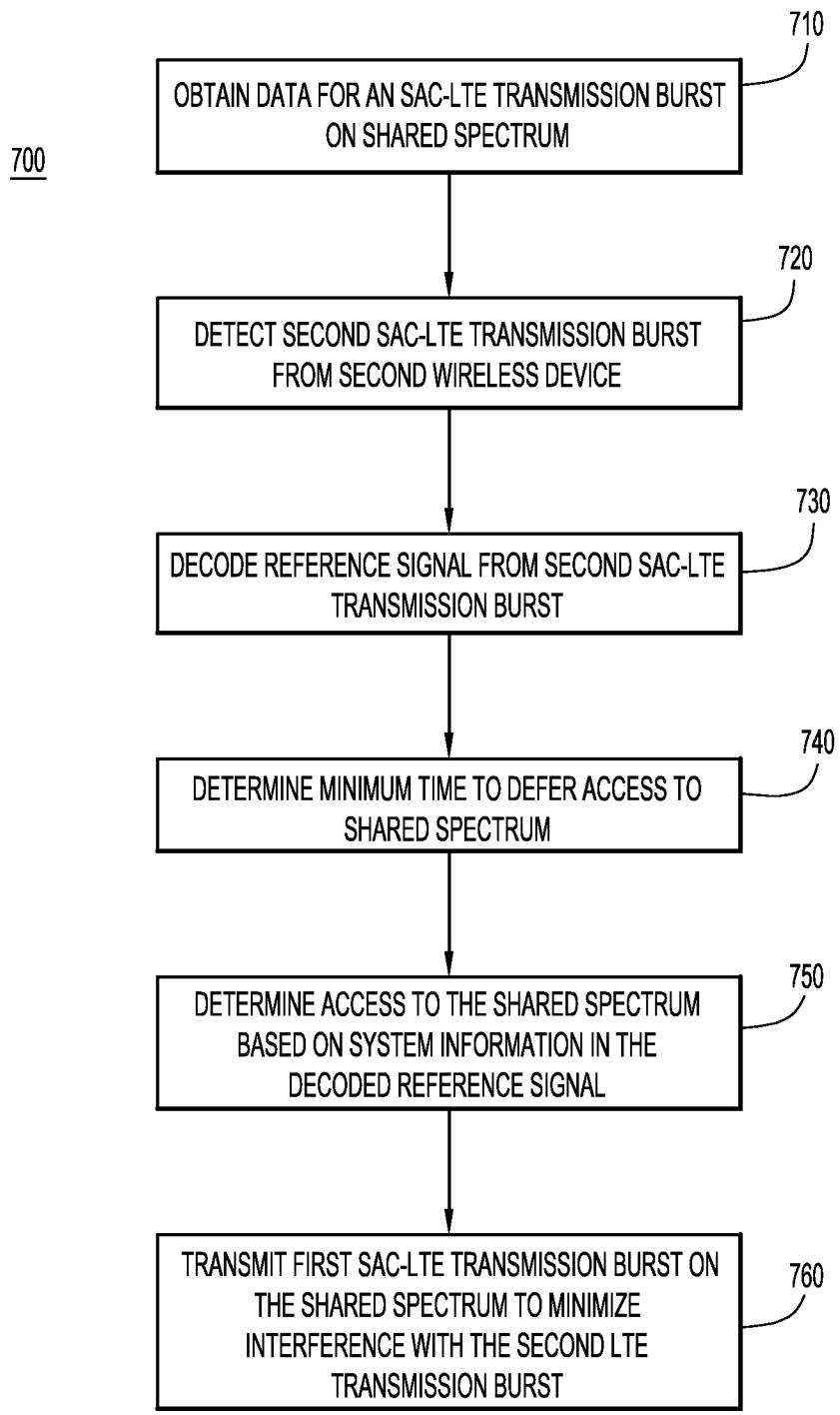
FIG. 7 is flowchart illustrating operations of a first LTE device in minimizing interference on an unlicensed spectrum with a second LTE device, according to an example embodiment.

Referring now to FIG. 7, a flowchart illustrates operations performed by a SAC-LTE device in minimizing interference with another SAC-LTE transmitter over a medium of shared/unlicensed spectrum. In step 710, the SAC-LTE device obtains data for a SAC-LTE TXOP. The TXOP is designated to be wirelessly transmitted over a shared spectrum. In step 720, the SAC-LTE device detects a second SAC-LTE TXOP on the shared spectrum transmitted from a second wireless device. The second wireless device may be run by the same operator (e.g., wireless telephone carrier) or a different operator.

In step 730, the SAC-LTE device decodes a set of reference signals, which may include a preamble comprising at least the primary and secondary synchronization signals (PSS and SSS), reference signal pilots and system information from transmission bursts from a second SAC-LTE device. The preamble may also contain the information regarding the duration of the TXOP from the second SAC-LTE device. The decoded reference signal pilots may include a Cell-Specific Reference Signal (CRS), a Channel State Information Reference Signal (CSI-RS), or a Discovery Reference Signal (DRS).

Based on the duration of the second SAC-LTE TXOP indicated in the decoded reference signal (e.g., the preamble), in step 740, the SAC-LTE device determines a minimum time that it needs to defer access to the shared spectrum in order to avoid collisions with the second SAC-LTE TXOP. In step 750, the SAC-LTE device determines access to the shared spectrum based on the results of decoding the reference signal. The decoded system information provides the SAC-LTE device information regarding to which operator (e.g. Public Land Mobile Network Identifier (PLMN-ID)) the second SAC-LTE device is registered. The decoded preamble provides information regarding the duration of the TXOP from the second SAC-LTE device, while the decoded reference signal may provide information about the identity and the received signal strength of the TXOP from the second SAC-LTE device. The determination of the received signal strength enables the SAC-LTE device to adjust its energy detection threshold according to the measured signal strength. The duration of the second SAC-LTE device's TXOP enables the SAC-LTE device to defer its transmissions so that it can avoid potentially colliding with the second SAC-LTE TXOP. In step 760, the SAC-LTE device transmits its SAC-LTE TXOP on the shared spectrum such that any interference with the transmission from the second wireless device (e.g., the second SAC-LTE TXOP) is minimized.

In another example, the decoded reference signal may provide an identity of the second wireless device (e.g., the PCI), and allow the SAC-LTE device to determine the operator of the second wireless device. If the second wireless device and the SAC-LTE device share the same operator, then the operator can configure the operation of the SAC-LTE device and the second wireless device, or the SAC-LTE device may be able to negotiate with the second wireless device (e.g. through a channel on a licensed spectrum or via backhaul channels) so as to share the unlicensed spectrum without interfering with each other. If the second wireless device is not supported by the same operator as the SAC-LTE device, then the SAC-LTE device may change to a different channel in the unlicensed spectrum to avoid interfering with the second wireless device.

To summarize, presented herein are mechanisms to reduce collisions in deployments with Wi-Fi and SAC-LTE equipment as well as SAC-LTE equipment from multiple operators. The mechanisms enhance the baseline Energy Detect mechanism by incorporating methods to decode cross-technology physical layer elements (e.g., preamble, PLCP, etc.) and MAC layer (e.g., NAV, RTS/CTS) on the Wi-Fi side to elements like a Cell Specific Reference Signal on the SAC-LTE side. These methods described improve the detection potential transmitters thereby reducing chances of cross-technology collisions.

In one form, a method is provided for minimizing interference between cross-technology wireless transmissions in a shared spectrum. The method comprises, at a first wireless device, obtaining data to be wirelessly transmitted in a transmission burst according to a first format over a shared spectrum. The wireless device detects a wireless preamble to a wireless transmission in a second format on the shared spectrum. The wireless transmission is transmitted from a second wireless device using the second format. The wireless device decodes the wireless preamble and determines a minimum time to defer access to the shared spectrum based on the decoded wireless preamble. The wireless device transmits the data in the transmission burst over the shared spectrum after deferring for at least the determined minimum amount of time so as to minimize interference between the transmission burst in the first format and the wireless transmission in the second format.

In another form, an apparatus is provided comprising a transmitter, a receiver, a modem, and a processor. The transmitter is configured to transmit signals in a shared spectrum using at least a first format. The receiver is configured to receive signals in the shared spectrum in at least the first format and a second format. The modem is configured to modulate signals and demodulate signals. The processor is configured to obtain data to be wirelessly transmitted by the transmitter in a transmission burst according to the first format over the shared spectrum. The processor is further configured to detect a wireless preamble to a wireless transmission in the second format on the shared spectrum via the receiver. The wireless transmission is transmitted from a second wireless device. The processor is configured to decode the wireless preamble and determine a minimum time to defer access to the shared spectrum based on the decoded wireless preamble. The processor is further configured to cause the transmitter to transmit the data in the transmission burst over the shared spectrum after deferring for at least the determined minimum amount of time so as to minimize interference between the transmission burst and the wireless transmission from the second wireless device.

In yet another form, a method is provided for minimizing interference between two SAC-LTE transmitters using a shared spectrum. The method comprises, at a first wireless device, obtaining data to be wirelessly transmitted in a first SAC-LTE transmission burst over the shared spectrum. The first wireless device detects a second SAC-LTE transmission burst transmitted from a second wireless device on the shared spectrum. The first wireless device decodes a reference signal in the second SAC-LTE transmission burst. Based on a duration of the second SAC-LTE transmission burst indicated in the decoded reference signal, the first wireless device determines a minimum time to defer access to the shared spectrum. The first wireless device determines access to the shared spectrum based on system information in the decoded reference signal. The system information indicates a wireless network operator supporting the second wireless device. The first wireless device transmits the first SAC-LTE transmission burst over the shared spectrum so as to minimize interference between the first SAC-LTE transmission burst and transmissions from the second wireless device.

The above description is intended by way of example only. In particular, the techniques presented herein and described with respect to SAC-LTE, LAA-LTE, LAA, or LTE-LAA devices and transmissions may also be used with respect to any type of LTE devices and transmissions that use unlicensed wireless spectrum, and are not intended to be limited to LAA-LTE implementations.

What is claimed is:
1. A method comprising:
at a first wireless device, obtaining data to be wirelessly transmitted in a transmission burst according to a first format over a shared spectrum;
detecting a wireless preamble to a wireless transmission in a second format on the shared spectrum, the wireless transmission being transmitted from a second wireless device;
decoding the wireless preamble;
determining a minimum time to defer access to the shared spectrum based on the decoded wireless preamble;
adjusting an energy detection threshold based on the decoded wireless preamble;

determining whether the shared spectrum is free based on the adjusted energy detection threshold; and responsive to a determination that the shared spectrum is free, transmitting the data in the transmission burst over the shared spectrum after deferring for at least the determined minimum amount of time so as to minimize interference between the transmission burst in the first format and the wireless transmission in the second format from the second wireless device.

2. The method of claim 1, wherein the first format is a Shared Access Long Term Evolution (SAC-LTE) standard and the second format is an IEEE 802.11 standard.

3. The method of claim 2, wherein the wireless preamble comprises a Physical Layer Convergence Procedure (PLCP) header.

4. The method of claim 3, wherein decoding the wireless preamble further comprises determining a duration of the wireless transmission from the PLCP header.

5. The method of claim 4, further comprising transmitting a message configured as a Clear-to-Send to Self after the duration of the wireless transmission.

6. The method of claim 5, further comprising deferring access to the shared spectrum for a randomly determined backoff period after transmitting the message configured as a Clear-to-Send to Self.

7. The method of claim 2, wherein decoding the wireless preamble comprises one of monitoring a Request-To-Send/Clear-To-Send (RTS/CTS) exchange or decoding a Media Access Control Protocol Data Unit (MPDU), and further comprising determining a network allocation vector including a duration of the wireless transmission.

8. An apparatus comprising:
a transmitter configured to transmit signals in a shared spectrum in a first format;
a receiver configured to receive signals in the shared spectrum in the first format and in a second format;
a modem configured to modulate signals and demodulate signals;
a processor configured to:
obtain data to be wirelessly transmitted in a transmission burst according to the first format over the shared spectrum;
detect a wireless preamble to a wireless transmission in the second format on the shared spectrum via the receiver, the wireless transmission being transmitted from a second wireless device;
decode the wireless preamble;
determine a minimum time to defer access to the shared spectrum based on the decoded wireless preamble;
adjust an energy detection threshold based on the decoded wireless preamble;
determine whether the shared spectrum is free based on the adjusted energy detection threshold; and
responsive to a determination that the shared spectrum is free, cause the transmitter to transmit the data in the transmission burst over the shared spectrum after deferring for at least the determined minimum amount of time so as to minimize interference between the transmission burst and the wireless transmission from the second wireless device.

9. The apparatus of claim 8, wherein the first format is a Shared Access Long Term Evolution (SAC-LTE) standard and the second format is an IEEE 802.11 standard.

10. The apparatus of claim 9, wherein the processor is configured to decode the wireless preamble as a Physical Layer Convergence Procedure (PLCP) header.

11. The apparatus of claim 10, wherein the processor is further configured to decode the wireless preamble by determining a duration of the wireless transmission from the PLCP header.

12. The apparatus of claim 11, wherein the processor is further configured to cause the transmitter to transmit a message configured as a Clear-To-Send to Self message after the duration of the wireless transmission.

13. The apparatus of claim 12, wherein the processor is further configured to defer access to the shared spectrum for a randomly determined backoff period after causing the transmitter to transmit the message configured as a Clear-to-Send to Self.

14. The apparatus of claim 8, wherein the processor is configured to decode the wireless preamble by one of monitoring a Request-To-Send/Clear-To-Send (RTS/CTS) exchange or decoding a Media Access Control Protocol Data Unit (MPDU), and wherein the processor is further configured to determine a network allocation vector including a duration of the wireless transmission.

15. A method comprising:
at a first wireless device, obtaining data to be wirelessly transmitted in a first Shared Access Long Term Evolution (SAC-LTE) transmission burst over a shared spectrum;
detecting a second SAC-LTE transmission burst from a second wireless device on the shared spectrum;
decoding a reference signal in the second SAC-LTE transmission burst;
determining a minimum time to defer access to the shared spectrum based on a duration of the second SAC-LTE transmission burst indicated in the decoded reference signal;
determining access to the shared spectrum based on system information in the decoded reference signal, the system information indicating a wireless network operator supporting the second wireless device;
adjusting an energy detection threshold based on the decoded reference signal;
determining whether a channel on the shared spectrum is free based on the adjusted energy detection threshold; and
responsive to a determination that the channel on the shared spectrum is free, transmitting the first SAC-LTE transmission burst over the shared spectrum so as to minimize interference between the first SAC-LTE transmission burst and transmissions from the second wireless device.

16. The method of claim 15, wherein the reference signal comprises at least one of a Primary Synchronization Signal (PSS), a Secondary Synchronization Signal (SSS), a Cell-Specific Reference Signal (CRS), a Channel State Information Reference Signal (CSI-RS) or a Discovery Reference Signal (DRS).

17. The method of claim 15, wherein the reference signal is decoded to determine a Physical Layer Cell Identifier of the second wireless device.

18. The method of claim 17, wherein the first wireless device is supported by the wireless network operator and further comprising coordinating transmission of SAC-LTE frames over the shared spectrum using a channel on a licensed spectrum.

19. The method of claim 15, wherein the first wireless device is not supported by the wireless network operator, further comprising transmitting the first SAC-LTE transmission burst on a separate channel on the shared spectrum, the separate channel being different than a channel used by the second SAC-LTE transmission burst.

20. The method of claim 15, further comprising measuring a signal strength of the second SAC-LTE transmission burst and adjusting the energy detection threshold based on the measured signal strength.

\* \* \* \* \*